Sept. 16, 1952     E. A. AVAKIAN     2,610,791
STORED FUNCTION CALCULATOR Filed April 18, 1950     7 Sheets-Sheet 3

Inventor
Emik A. Avakian
by The Firm of Charles Hills
Attys

Sept. 16, 1952  E. A. AVAKIAN  2,610,791
STORED FUNCTION CALCULATOR
Filed April 18, 1950  7 Sheets-Sheet 4

Inventor
Emik A. Avakian

Inventor
Emik A. Avakian

Patented Sept. 16, 1952

2,610,791

UNITED STATES PATENT OFFICE 2,610,791

STORED FUNCTION CALCULATOR

Emik A. Avakian, Yonkers, N. Y.

Application April 18, 1950, Serial No. 156,580

11 Claims. (Cl. 235—61.9)

The present invention relates to calculating apparatus, and more particularly, to a "memory" device for such apparatus comprising stored, systematically arranged symbols, an automatic selector and a translator. It relates to all types of telecommunication apparatus, as well as calculating apparatus, wherever predetermined responses subject to tabulation are to be introduced.

An object of this invention is to provide a calculating apparatus which is quite compact and yet stores for quick selection over one million discrete responses.

Another object of this invention is to store indicia of these responses by means of meaningful patterns of translucent points printed on otherwise opaque film.

Another object of this invention is to arrange the indicia or patterns in an orderly manner to facilitate rapid automatic selection.

Another object of this invention is to provide an automatic selector to accurately position the required symbol for optical projection.

A further object of this invention is to adapt a standard calculating machine to actuate the selector and to receive the responses.

Still a further object of the invention is to provide a translator to convert the optically projected pattern into a suitable signal response.

Another specific object of this invention is to mount the films imprinted with the symbols upon separate spool and sprocket systems, any one of which may be selected.

Another specific object of the invention is to arrange the symbols in rectilinear tabular forms, so that by axial translation and simultaneous rotation of the film mounts, the correct position on the film may be rapidly selected.

Another object of the invention is to provide a unique optical reading device, whereby a scanning shade upon which a single selected pattern is projected sequentially admits the discrete squares of light composing the pattern into a chamber containing a photo-responsive element.

In the illustrated embodiment of the invention, a ten-key adding machine is provided to carry on the arithmetic computations, to print the numbers and symbols which are important to the calculation, to actuate the selector, and to receive the codified responses. In this embodiment, the symbols stored on the films represent various tabulated functions, such as logarithms, trigonometric functions and the like. As these functions are to be carried to six places, the selector has six separate electromagnetic drive units, each for an order of digit and all operable simultaneously.

In operation, the keys of the adding machine are depressed in proper sequence to represent, for example, a six digit number. When the non-add key is depressed, six print bars are raised to heights corresponding to the value of the respective digits. The movements of each of the bars are sensed and simultaneously conveyed to the six corresponding drive units. Therewith, the proper symbol is brought before a collimated beam of light to be projected onto the translator.

This translator, as it scans the projected light pattern, transmits electrical pulses to the adding machine to actuate the appropriate keys in the proper sequence. The new number now placed in the machine is the correct function value of the original number.

A feature of the invention is, then, a closed-loop response system.

A further feature relates to the exclusively electrical interconnections between the controlling apparatus and the responsive apparatus, whereby the controlling apparatus may be positioned remotely from the remainder. Furthermore, several such apparatus may be alternatively switched into the circuit to allow control from different stations. It is contemplated that this invention might be used in industrial process control, making appropriate responses to several variable parameters. Also, the electrical nature of the input and output signals suggest the use of this invention with tele-communication systems.

Other objects and features of this invention will become apparent upon a consideration of the following detailed description, referring to the illustrated embodiment which is shown by way of an example, and in which.

Figure 1:
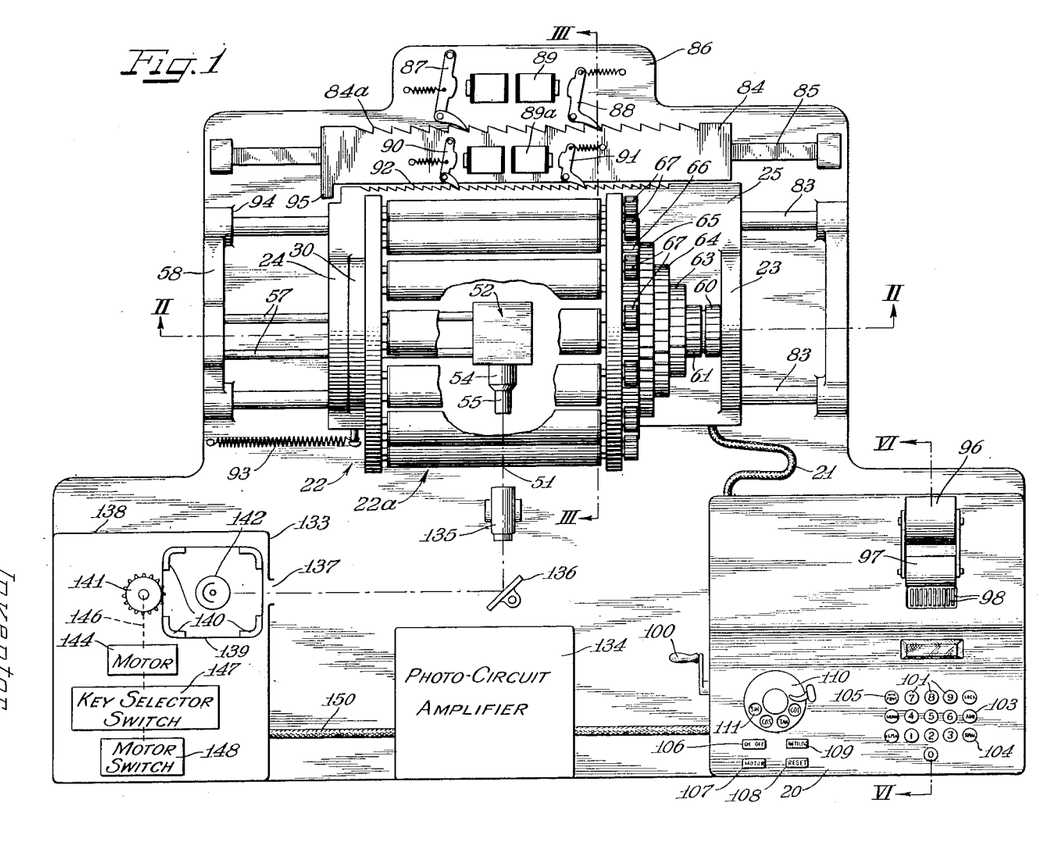
Figure 1 is a schematic plan view, with some parts cut away, of one embodiment of the present invention.

In Figure 1, the machine is seen in plan view as a ten-key controlling calculator 20. This calculator is connected only by electrical cables to the remainder of the device. This calculator 20 is similar in many respects to a conventional ten-key adding machine such as in the Sundstrand Patent No. 1,198,487, but it is to be understood that any ten-key adding machine, including those most lately developed, may be utilized. The only restrictions are that the machine have a sufficient digit capacity and that the working parts be not so restricted as to prohibit the modifications thereto which will hereinafter be specified. It is desirable that the keyboard include a non-add key, a non-print key, an error key, a sub-total and a total key and any additional keys which are common to modern calculators.

The film support structure

Connected with the controlling calculator 20 by the cable 21 is the symbol pattern storer 22. The movable elements of the storer 22 are supported by two endwise pedestals 23 and 24 which are secured to a common carriage 25.

Figure 2:
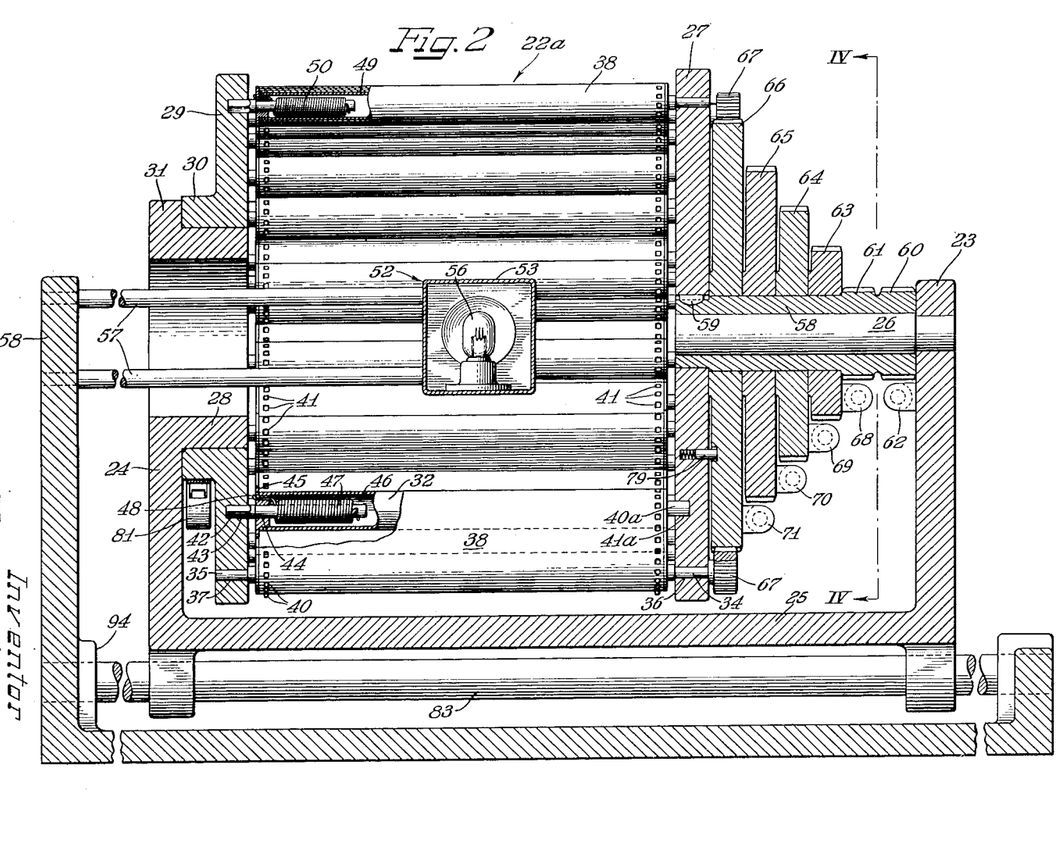
Figure 2 is a partial cross-section of the film-holding drum along the line II—II of Figure 1.

Referring now to Figure 2, pedestal 23 has secured to its upper portion an extended, horizontal spindle 26 which toward its outward end indirectly supports a spider hub 27. The other pedestal 24 has its upper portion formed as a hollowed spindle 28 on the outward surface of which a second spider hub 29 is journaled. A flange 30, formed integrally with the hub 29, extends against a shoulder 31 on the pedestal to partially restrain the axial movement of the end plate. Between the plates 27 and 29 are mounted a large number of film take-up spools 32 and 49, and drive sprockets 33. A drum 22a comprising the plates 27 and 29 and the film spools is thus formed.

The drive sprockets 33 are supported by trunnion pins 34 and 35, fitting in bearing holes 36 and 37 suitably positioned in the end plates 27 and 29. A roll film 38 (see Figure 3) is transported from one spool to the other spool and is guided by the flanges 39 at either end of the spools. The drive sprockets 33 are provided with film-engaging teeth 40 at either end to coact with perforations 41 (Figure 7) positioned along the length of the film.

Each take-up spool 32 is biased to wind film upon itself much as an ordinary curtain shade roll. The pin 40a at one end is round and fits in a circular socket 41a. The tongue 42 at the other end of this spool 32 is secured against rotation in a non-circular matching socket 43 and extends freely through the end flange 45. The spool 32 is free to rotate while the pin 42 remains stationary. In the hollow interior 46 of this spool, a spiral spring 47 is secured both to the pin 42 and to the interior wall of the spool at 48. This spring is spiral wound so as to urge the spool to turn in a direction which will take up additional film.

Figure 3:
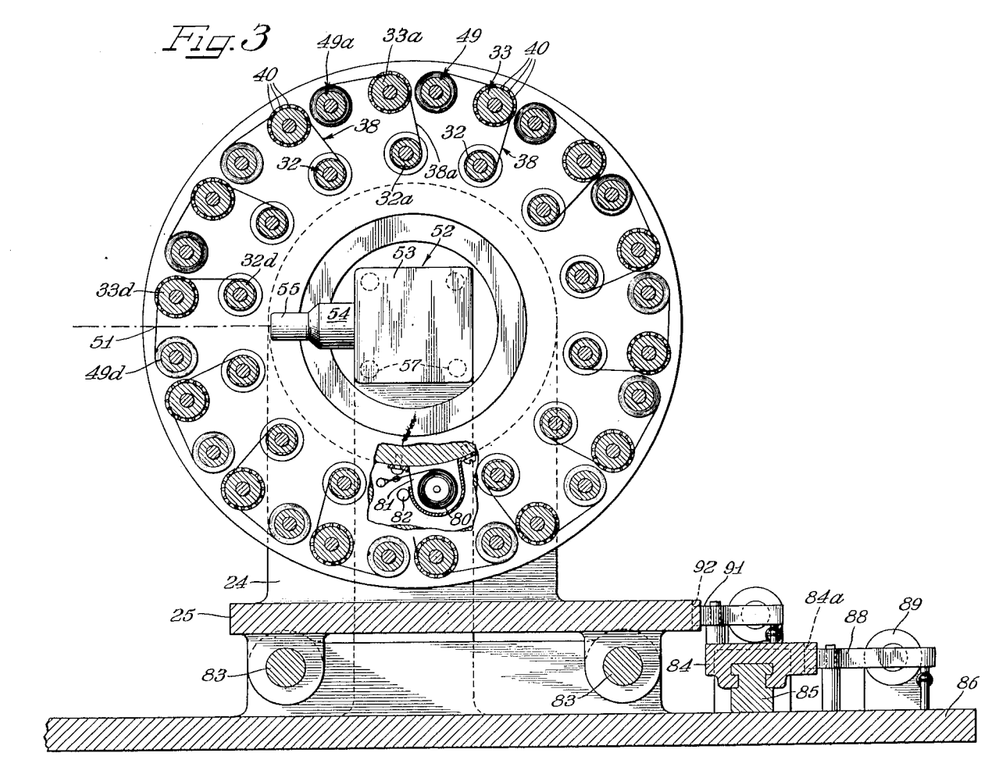
Figure 3 is a diagrammatic cross-section of the film-holding drum along the line III—III of Figure 1, with a portion cut away to reveal the zero return device.

In Figure 3, the arrangement of all of the spools around the drum is shown to be a series of "L's," one leg of which extends radially and the other, generally, circumferentially. The spool 33a at the junction of the two legs is the drive spool. The film 38a is maintained taut across the drive spool surface by means of take-up spool 32a and a contrarily biased supply spool 49a. Each of these L-shaped units is the same except in respect to the pattern printed upon the respective films 38.

It is contemplated that the first ten films will carry complementary portions of the six-place common logarithm table, that the remaining four films will carry in order sine, cosine and tangent trigonometric functions and natural logarithms, these latter being carried to five places.

In order that each of the films might tend toward a specific zero position, the bias spring 47 in spool 32 is made dominant over the corresponding spring 50 in spool 49 for all positions of the film. Therefore, the film will normally wind upon spool 32.

As illustrated in Figure 3, the film unit comprising spools 32d, 33d and 49d is properly positioned for the projection of a film pattern 51 by light emanating from a projector lamp 52. This lamp 52 comprises a housing 53, a focusing lens 54, a collimator 55, and a light source 56. The entire projector unit is suspended at the axis of the drum 22a, by four cantilever rods 57 which, in turn, are secured to a supporting post 58. Thus, while the position of the film drum 22a may be altered extensively in a manner to be set forth hereafter, the projector lamp will furnish a collimated beam of light directed along a fixed, invariant, horizontal line.

The possible rotational positions which the drum 22a may take are so selected that the projected light beam will pass between the spools 33 and 49 of a set, corresponding to spools 33d and 49d here shown. Then, depending on the extent to which the film has been wound off the spool 32d and depending upon the relative axial position of the film drum 22a with respect to lamp 52, a particular film pattern 51 will be positioned squarely across the light beam. The mechanism for bringing this particular film pattern 51 into position will next be described.

Suitable cross bracing may be added between the plates 27 and 29 to increase their torsional rigidity.

The number symbol selector mechanism

In order that the desired symbol may be properly positioned in the line of the collimated light beam, a solenoid-type drive mechanism is utilized to rotate the film drum, to turn the film spools, and to translate the drum carriage along a set of tracks. The gear and rack assemblies which are acted upon by the drive mechanism will first be considered.

In Figure 2, the spindle 26 has a journaled sleeve 58 fitted upon its length, which sleeve directly supports at its outward end the spider plate 27. Moreover, this plate is fixed to rotate with the sleeve by means of a key 59 or any other conventional device. The end of the sleeve 58, adjacent the pedestal 23, has the form of an integral pair of pinions 60 and 61, ratchet teeth being provided around their periphery. Since the end plate 27 is keyed to the sleeve, it and the entire film drum 22 will turn with the pinions 60 and 61. To effect this turning, the solenoid drive mechanism 62 secured to the pedestal 23 acts upon the pinion 60. Sufficient teeth are provided on this pinion to make possible the selections of any one of the many separate film units, fourteen of which are shown here by way of illustration, and not by way of limitation.

Between the pinion 61 and the end plate 27, four gears 63, 64, 65 and 66 are journaled on the sleeve. The gear 66 is positioned as a sun gear and is in mesh with a plurality of planetary gears 67 which turn the film drive sprockets 33 through the shafts 34. Since the shafts 34 are fixed with respect to the plate 27, any relative movement between the sun gear 66 and this plate will result in turning each and every one of the drive sprockets, fourteen of them here illustrated.

To make possible such a relative motion as will contain coarse and fine components in correspondence to the several digit values of multiordered numbers, the several component motions are cascaded through the four adjacent pinions. The coarsest component is entered by the drive mechanism 68 acting upon pinion 61. Appropriately, there might be ten positions available, spaced equally around one complete revolution of pinion 63 relative to pinion 61. As the drive 62 controls the position of the pinion 60, this relative rotation will be more readily conceived if pinion 61 is considered to be fixed with respect to the spindle 26. Then the drive 68 attached to the face of pinion 63, that pinion will be rotated relative to the spindle.

Drive 69 will transmit the rotation of pinion 63 to the adjacent pinion 64. It will also contribute an additional component of rotation to correspond to a lower order digit. These two components of motion are carried on to pinion 65 through drive 70 and a third and finer component added. Drive 71 contributes a fourth component yet finer, and transmits the resulting motion to sun gear 66. As this rotation has been established relative to pinion 61, it exists to the same extent relative to the plate 27. The result is a repositioning of the films of each of the units by the planetary gears 67.

It is contemplated that each of the drives 62, 68, 69, 70 and 71 will be actuated simultaneously. In consequence, while the desired film unit is being brought into position, the film of the unit and each of the other units is being wound off the take-up spool 32, onto spool 49 to an extent determined simultaneously by four additive components of motion. If these components represent digits in a decimal system, the ratio of numbers of teeth in adjacent gears will be 10:1. However, to effect a shift from log symbols to antilog symbols or from a trigonometric function to an angle, the teeth of one set of adjacent pinions stand in the ratio of 1:2. In the particular form illustrated, this set consists of pinions 63 and 64.

Figure 4:
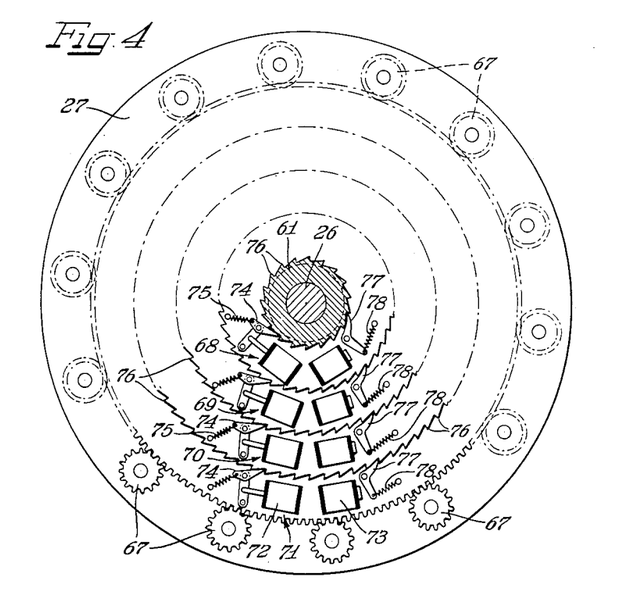
Figure 4 is a detailed showing of the row selecting drive taken from line IV—IV of Figure 2.

The drive mechanisms by means of which the component relative rotations are added is best illustrated in Figure 4. Power drive mechanism 71, attached to pinion 66, acts upon the teeth of pinion 65. Likewise, drive mechanisms 70, 69 and 68 are attached to their respective pinions 65, 64 and 63 and act upon the teeth of the adjacent smaller pinions. Each of these drive mechanisms may comprise the same elements, though the proportions of these elements may be varied. Each drive comprises a drive solenoid 72 and a release solenoid 73, each attached to appropriate energizing sources by leads which are not here shown. The drive solenoids actuate a pawl 74 in opposition to a spring 75. When the solenoid is deenergized, the spring draws the pawl away from contact with the ratchet teeth 76. While the pawl is being returned to its deenergized position, a motion-arresting pawl 77 is forced against the ratchet teeth by a spring 78. When the release solenoid 73 is energized, it will disengage the arresting pawl 77 to permit the teeth to be rotated back to their zero position. While this description has been given with reference to the drive mechanism 71, it may be applied without change to the other drive mechanisms.

The return to a zero position mentioned above is achieved in part through the stored energy in springs 47 of the take-up spools 32. It will be recalled that these are the dominant springs in each of the film units. A stop device 79 (Figure 2) acting between contiguous faces of gear 66 and end plate 27 limits the return of the film to a definite position by limiting the relative rotation backward between the plate and the sun gear 66.

Exactly similar to the above described drive mechanisms is the drive 62 mounted on the pedestal 23. When the release solenoid of this drive is energized, a return spring 80 (Figure 3), mounted in a housing 81 jutting from the hub 30 returns the entire drum 22a to a zero position. This zero position occurs when housing 81 projecting from hub 30 strikes the pin 82.

The translating drive is in many respects similar to the rotational drive. Referring back to Figure 1, the tracks 83 on which the base 25 moves are seen to run in a direction parallel to the axis of the drum 22a. At the rear of the base, a ratchet bar 84 is guided on a parallel track 85. Behind this movable ratchet bar 84 lies a stationary platform 86 on which are mounted a drive solenoid mechanism 87, an arresting pawl 88 and a release solenoid 89. These devices function exactly as the above described drives, such as 71, acting upon the ratchet teeth 84a of bar 84. The bar may be advanced to any one of a number of equally spaced, discrete positions, which for the decimal system would number 10. This provides a coarse component of translational position. A similar drive 90 and releasable arrester 91 act upon teeth 92 of finer pitch which are secured to base 25. Thus, whatever motion is imparted to the ratchet bar 84 is transferred to the base 25, with an additional component of motion supplied by drive 90. For use with decimal numerals, the teeth 84a may have a pitch 10 times that of teeth 92.

As before, provision is made for a zero return position. When the release solenoids 89 and 89a are energized, the tension stored in spring 93 returns the base 25 against the stops 94. In returning, the base also engages boss 95 projecting from the ratchet bar so as to return the bar also to a zero position.

It is contemplated that all the components of motion may be introduced simultaneously, the components rapidly being added to give a resultant position. It is furthermore contemplated that all the release solenoids may be energized simultaneously to return the drum and film to their zero positions.

*Calculator-controller*

The calculator 20 of Figure 1 performs the multiple function of printing, adding and subtracting numbers, controlling the selector mechanism, and responding to information provided by the translation device. A paper supply roll 96, a feed roll 97, print bars 98, and a ten-key keyboard are shown in conventional arrangement in the right-hand portion of the device. At the left, the special controls are grouped.

Mechanical operating power for this device may be supplied either through the hand crank 100 or from the now familiar electric motor drives.

Figure 5:
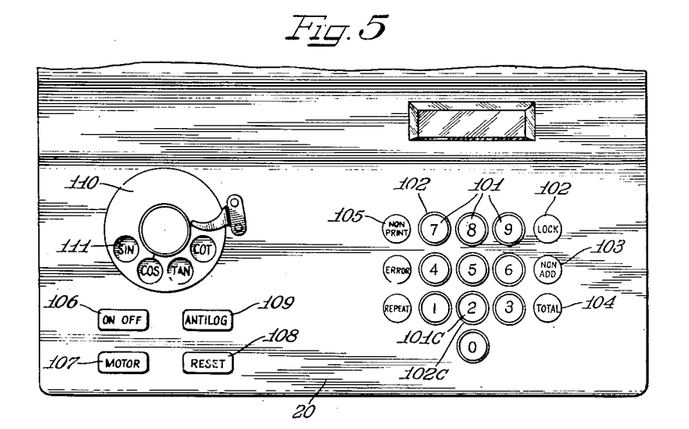
Figure 5 shows the plan of the controlling keyboard.

In Figure 5, the keyboard is shown in detail. Surrounding and operating upon each of the ten digit keys 101 is a solenoid 102. When suitably energized, these solenoids act to depress the keys just as an operator would with his fingers. Flanking the digit keys 101 are the usual auxiliary keys including expressly a non-add key 103, a total key 104, and a non-print key 105.

The remainder of the switchboard exhibits the special controls. Actuator 106 is the main "on-off" power switch for this apparatus. Motor actuator switch 107 starts the translation device motor upon its scanning cycle, in a manner which will be discussed at greater length hereafter.

The reset key 108 may be pressed to energize all the release solenoids, permitting the selector mechanism to reset to zero. In the application of this device to computations involving logarithms, anti-log key 109 actuates the selector mechanism to bring before the projected light beam those symbols representing anti-logs rather than logarithms. Above these buttons, a modified telephone call dial 110 is provided as a selector of the films bearing functions other than logarithms. To obtain a cosine function, for example, the operator places his finger in aperture 111 and dials in the usual manner. The interior mechanism of the dial then sends out twelve time-spaced electric pulses to the film selector drive 62 (Figure 2). Of these twelve pulses, ten are automatically supplied to carry the selector mechanism past the contemplated ten logarithm films. The remaining number of pulses will determine which of the auxiliary film units is selected. In this case, the second, bearing tabulated cosine functions would be positioned before the projector lamp 51.

Figure 6:
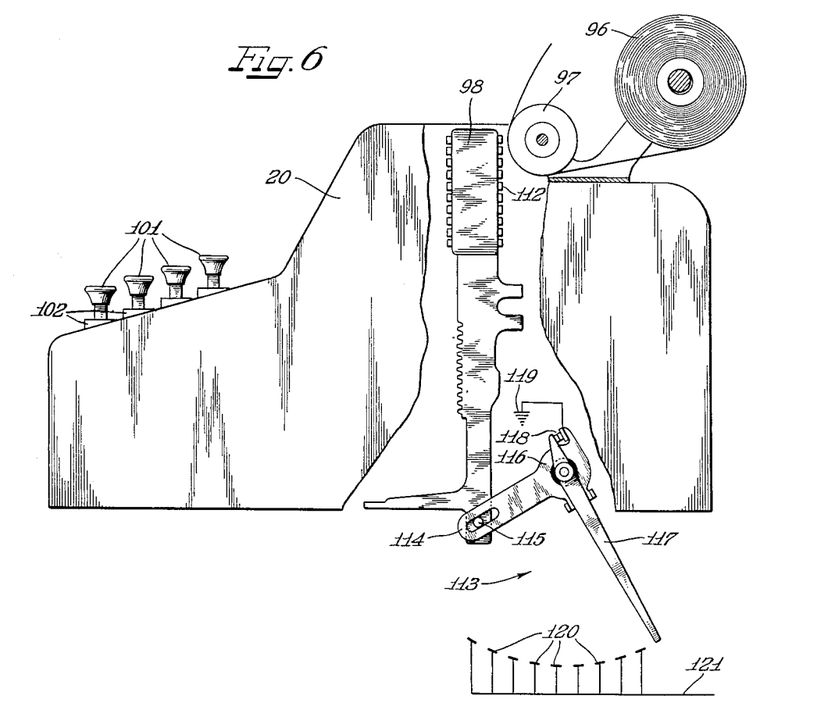
Figure 6 is a cross-section of the machine taken on line VI—VI of Figure 1 with the print bar position senser shown below.

In Figure 6, an elevational view of the print bar 98 is obtained. In the familiar fashion, when the crank 100 is operated, the printing mechanism raises the print bar 98 until the proper print-type carrying plunger 112 is in printing position. The plungers carry numerals from zero to nine arranged in order with "0" at the top. One print bar 98 is provided for each numerical order. While the digit value for each numerical order is set into the machine in proper sequence, the print bars 98 all rise simultaneously when actuated.

In this embodiment, the vertical movement of each print bar will control the operation of a separate selector drive. Thus, print bar 98 would, through its associated position sensor mechanism 113, control the selector drive 68, the numerical order represented being ten thousandth. The position sensor mechanism comprises a slotted lever arm 114 which follows pin 115 projecting from the print bar 98. A pivoted insulator hub 116 is fastened to the arm 114 and to a contact arm 117. Through friction urged contacts 118 associated with the hub, the contact arm 117 is grounded at 119 only when it is rotating in a clockwise direction. Thus, as arm 117 moves clockwise in response to the rising print bar 98, it successively makes electrical contact with contact points 120, all of which are connected to a common line 121. If voltage is applied to line 121, there will arise a succession of current pulses corresponding in number to the digit printed by the selected type plunger 112 on the corresponding print bar 98. There will be no larger a number since the contacts 118 are broken when the arm 117 ceases its clockwise rotation, and commences a return rotation.

*The stored function representation*

As suggested above, the tabular values of various functions are materialized in symbolic form by patterns 51 (Figure 1) of translucent points imprinted on opaque films. To cooperate with the selector mechanism, these symbol patterns are arranged seriatim in rectilinear columns and rows. Furthermore, the translucencies of each pattern are spaced within a meaningful grid, the rows of which represent numerical orders and the columns of which represent the digit values from 0 to 9. This is known as the Hollerith point system.

It is contemplated in the illustrated embodiment to utilize 10 film units, each with two hundred thousand (200,000) separate symbols for common logarithm tables. For the auxiliary function, one film unit is provided again with two hundred thousand (200,000) symbols per film. Thus, the common logarithm tables may be carried out to six places or numerical orders, while the tables of auxiliary functions may be carried to five places. Other arrangements will readily be accommodated.

Figure 7:
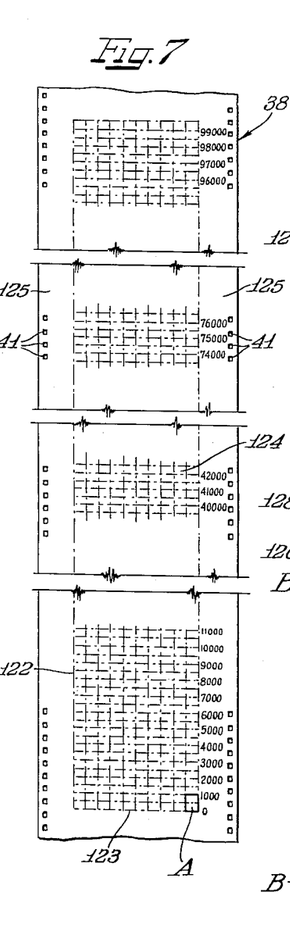
Figure 7 illustrates the layout of patterns on a film strip, the patterns corresponding to input numbers running from zero to 99,999.

In Figure 7, the first film is illustrated with longitudinal breaks in order that the entire length may be included. Transversely to the film strip are rows of symbols, 100 in each row, here shown divided into groups of tens by transverse parallel dotted lines. Likewise, every ten are indicated by a longitudinal dotted line. These dotted lines, of course, are not actually imprinted upon the film, but are illustrated merely for the purposes of ready visualization. On either side of the marked area 124 running the length of the film 38 is a border strip 125 carrying sprocket perforations 41 by which the film is advanced.

The number values associated with the dotted lines 122 and 123 show generally the order in which the symbols are arranged. These values correspond with the number placed upon the keys 101 to the printed bar values and which are sensed by the mechanism 113. While the particular arrangement shown is necessitated by relations within the selector mechanism, through changes in this selector mechanism, many other symbol arrangements could be incorporated. Here illustrated, the symbols are arranged in ascending order "0" to "99" in the first row, "100" to "199" in the second row, and so forth down the length of the film. However, every alternate set of ten rows repeats the arrangement of the first set, but with the symbols representing anti-logarithms instead of logarithms as in the first alternate sets. Proceeding in this fashion, the patterns are thus arranged ending with the set of ten rows, the last symbol of which corresponds to the anti-logarithm of "99,999."

Figure 8:
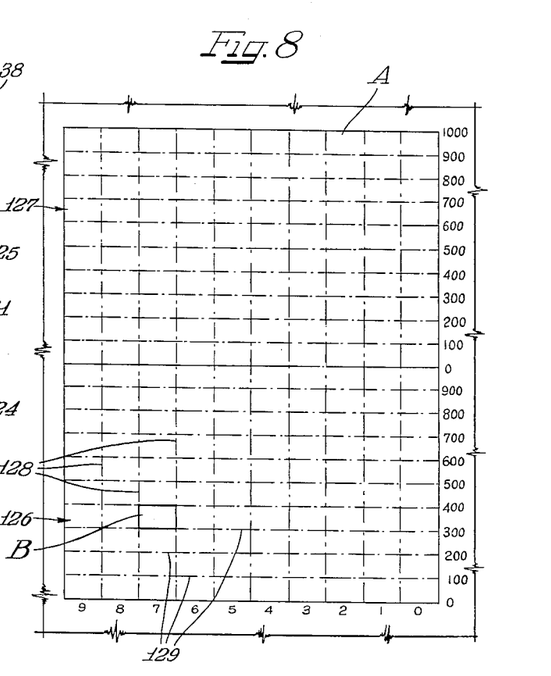
Figure 8 is an enlarged view of the portion A of Fig. 7.

In Figure 8, the frame set A marked off in Figure 7 is enlarged to afford a more detailed view of the pattern layout. The patterns in each of the frames 126, 127 follow the same order yet differ in that the patterns of frame 126 represent logarithmic values while those of frame 127 represent antilogarithmic values. Dotted lines 128 and 129 are again used illustratively to indicate the outlines of the symbols, one hundred of which comprise each frame. Blocked out in solid lines is the symbol B by which the logarithm of "307" is represented (diagrammatically illustrated here).

Figure 9:
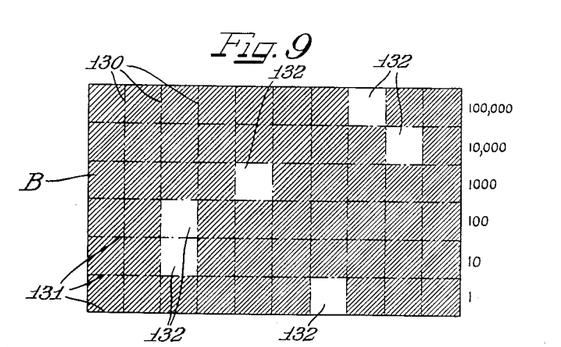
Figure 9 is an enlarged showing of the portion B of Figure 8, illustrating the symbol for log 307.

This symbol B is likewise enlarged in Figure 9 to show clearly the manner in which the transparent points are arranged to represent a six-place numeral. Again, an illustrative grid is superposed upon the film, here consisting of longitudinal dotted lines 130 and transverse dotted lines 131. Only the blocked-out squares 132 are transparent, the remainder of the film being opaque. Since the rows are marked as representing ascending numerical orders, and the columns are marked as representing the digits from "0" to "9", it is evident that the mantissa of the logarithm "307" is here shown to be "215774". Similar transparencies 132 distributed one to each row in each of the other symbols will represent their values. An exception exists with the symbols representing the auxiliary function values in that no transparencies are located in the top row representing the sixth numerical order, or 100,000's. As has been explained, these auxiliary functions are to be carried out to only five places.

Figure 11:
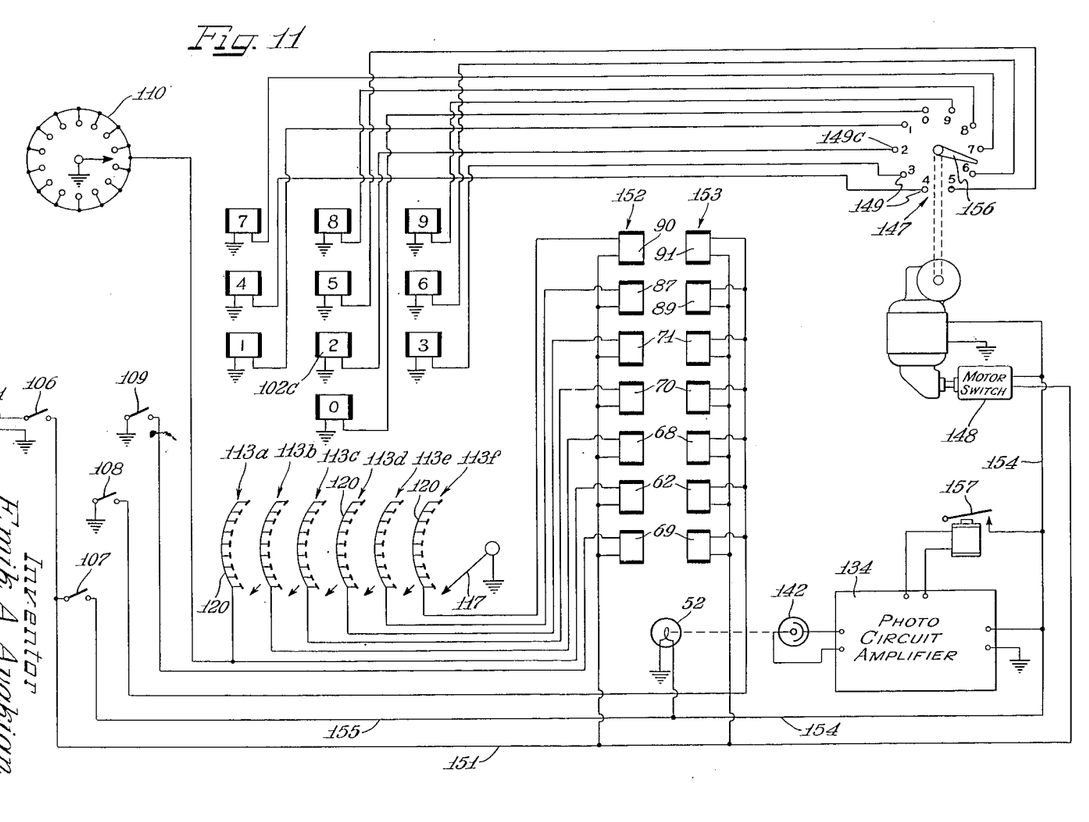
Figure 11 is a circuit diagram of the apparatus.

The manner in which an anti-logarithmic value is obtained in contrast to a logarithmic value will become more apparent from the discussion of the circuit diagram of Figure 11. However, it may be noted that just as selector drive 62 brings in position the correct film, selector drive 68 brings into position the desired two hundred rows of a given film, the selector drive 69 brings to position the desired twenty rows of these, just as does selector drive 70 select the desired ten rows, those containing logarithmic values or those containing anti-logarithmic values. Moreover, selector drive 71 positions the desired single row in front of the projector 51, while drive 87 positions the desired set of ten columns and drive 90 positions the single column of the set in front of the projected light beam. Thus, through the operation of the seven separate selector drives, a single symbol or pattern such as B is positioned across the light beam. Upon pushing the reset button 108, the springs 47, 80 and 93 will return the zero-zero pattern C of film No. 1 into position for projection.

*Translator response mechanism*

The patterns above described are necessarily interpreted and translated into the usual decimal numeral form. To accomplish this, the photo-sensitive translator 133 (Figure 1) and photo-amplifier 134 are incorporated in the apparatus. Together, these devices energize the key-depressing solenoids 102 in the sequence of the digits comprising the number represented by the symbol which has been projected.

Before the symbol light pattern reaches the translator 133, it is magnified by an enlarging lens 135 and, thereafter, reversed by reflection in mirror 136. By adjusting this mirror, the pattern is cast centrally upon an aperture 137 in the translator housing 138. While the housing is here shown without a top, in its operative state, it is light-tight excepting only at the single aperture 137. Passing across and pressed against this aperture on its inside face is a shade 139 passing as a continuous strip along the guides 140. A sprocket 141 acting on the span of the shade 139 opposite the aperture serves to drive the shade horizontally across the aperture. Within the shade's path of travel and in line with the light beam and the aperture is a photo-sensitive device 142.

Figure 10:
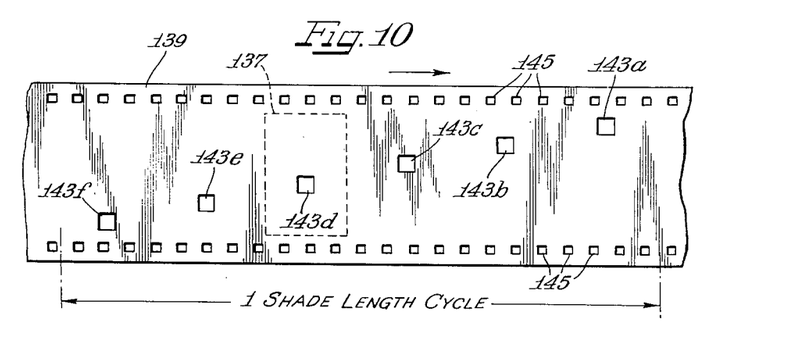
Figure 10 is a developed view of the continuous scanning shade.

While the shade is generally opaque as seen in Figure 10, there are provided a number of perforations 143 aligned in a row oblique to the direction of travel indicated by the arrow. The aperture 137 is here illustrated in dotted lines as a rectangle of length and width equal to the dimensions of the projected pattern. As the shade travels in the direction indicated, the top row of the pattern corresponding to the sixth numerical order of ten is swept by perforation 143a. Then, in succession, the remaining rows are swept by perforations 143b, 143c, and so forth. It will be recalled that the projected light pattern is composed of one ray of light per row or one for each transparent square 132. Thus, when perforation 143a passes in front of the light beam in the row of sixth order, the light may pass through and fall upon the light-sensitive device 142. In like manner, the remaining perforations will at some point of their travel across the width of the aperture 137 coincide in position with a beam of light, passing the light inwardly to the discharge device.

While the sprocket 141, driven by an electric motor 144, advances the shade by engagement with sprocket holes 145 along its top and bottom edges, the motor acting through shaft 146 simultaneously drives a key selector switch 147 and a motor control switch 148. The key selector switch 147 is so synchronized with the travel of shade 139 as to complete one revolution during the time taken by a single perforation 143 to cross the width of the light pattern (Figure 9). The successive perforations 143 may be so spaced that as one just passes beyond the projected light area, the next following just enters upon it. Thus, the key selector switch 147, preferably a rotary switch, will make the same contact as successive perforations 143 assume like positions relative to the projected light pattern. By providing ten contacts 149 (as in Figure 11), the positions at which the perforations 143 can coincide with the separate rays of the projected light pattern, there being ten such positions as shown in Figure 9, will be made to correspond with the ten contact positions of this key selector switch.

As will be explained more fully in connection with the circuit diagram of Figure 11, the motor switch 148 sustains the energization of the motor 144 after the starter button 107 is depressed and until the shade completes a cycle of travel, locating each ray of the pattern.

Referring now to Figure 11, when the power switch 106 which is connected to a power supply through line 151 is closed, voltage will be impressed upon the selector drive solenoids 152 and the reset solenoids 153. The drive solenoids 152 may be grounded through their respective print bar position sensing switches 113, excepting drive solenoid 69 which may be grounded through the anti-logarithm switch 109. The film selector solenoid 62 may also be grounded through the film selector dial 110, which is in parallel with the multi-position switch 113a. For convenience, each of the switches 113 are represented only by their respective arc of contacts 120, only a single pivoted contact arm 117 being illustrated for the group. It will be recalled that only as the arm 117 moves clockwise over the contact 120 is a ground connection made. Thus, as the print bars 98 rise to their respective printing positions, the drive solenoids 152 are energized intermittently by a proportionate number of electrical pulses, corresponding to the digit aligned for printing.

Referring back to the example of a cosine function being selected, it will be recalled that only five numerical orders have been provided for in the preparation of the auxiliary function films. Since the print bar 98 which prints the sixth numerical order would then be dormant, no energization of drive solenoid 62 would arise from the associated position sensor switch 113a. Instead, the operator in turning the dial 110 to the cosine position would cause the drive solenoid 62 to be energized by twelve timed electrical pulses. It is apparent that this invention need not be limited to this particular form, as any device supplying spaced electrical pulses could be used to control the solenoid drive.

The reset solenoids 153 are simultaneously energized when reset switch 108 is closed. The entire selector mechanism is, therefore, controlled by four elements of the device, the print bar position sensors 113, the anti-logarithm switch 109, the auxiliary function selector dial 110, and the reset switch 108.

Lead 151 also carries power through the switch 106 to a main power bus 154. The motor switch 148 interposes in the line 151 to deenergize the bus 154 upon the completion of each translator shade cycle. To start the motor 144 upon a new cycle, it must be caused to rotate by means of a momentary supply of power in order that the motor switch 148 will be set again to its closed position. This momentary power is supplied through starter switch 107 and line 155 connected to the bus 154.

As the motor proceeds upon a new cycle of rotation, the contact arm 156 of the key selector switch 147 passes over the ten contacts 149 in succession. However, power is supplied to the contact arm 156 only when a relay is closed. In control of this relay 157 is the photo-circuit amplifier 134 which is responsive to the condition of the photo-sensitive device 142. As the first shade perforation 143a travels across the upper row of the projected light pattern, representing the sixth numerical order, consider the instant when the perforation coincides in position with a ray of the light pattern representing the digit "2". The ray of light will pass from the source 52 onto the light-sensitive surface of the discharge device 142. The amplifier 134 immediately reacts to close the relay 157, thereby applying voltage to the contact arm 156. Since the position of this arm and that of the perforations 143 are synchronized to correspond a given digit at each instant, the contact arm 156 will now be upon contact 149c representing the digit "2". This contact 149c carries current to the solenoid 102c to its associated key 101, which is the "2" key. As successive perforations 143 move before the remaining rays of the light pattern, the keys 101 will be set in order to place in the machine the remaining five digits of the six-digit number.

*Mode of operation*

To illustrate the operation of this invention, the calculation of the value of 307 sin 37 degrees 40 minutes, twenty-four seconds by means of logarithms will be described. As it is contemplated to carry the trigonometric functions only to five numerical places, the angle will be represented by the number "37404", "37" being the degrees, "40" being the minutes, and "4" being the value of the seconds represented as the nearest tenth of a minute. Alternatively, the angle could be represented by its value in radians, carried to five places. At any rate, the value of the angle is placed upon the keyboard and the sine function selected on the dial 110. The non-print key 105 and the non-add key 103 are then depressed in that order. The print bars 98 rise to the positions corresponding to the number "37404" at the same time moving the position sensor switches 113 through corresponding arcs. The impulses flowing through drive solenoid 62 and the selector dial 110 rotate the drum 22a through eleven positions to bring the film 38 on which the sine functions are tabulated into position for projection. At the same time, the other solenoids 68, 70, 71, 87, and 90 reel the film and shift the drum to bring the exact pattern representing the sine of 37 degrees, 40.4 minutes into the path of the light beam.

The operator then presses the motor start switch 107 to initiate the translator cycle. The number represented by the selected pattern is then set into the machine in the manner described above. The operator presses first the reset 108 to return the drum to its zero position and then presses the non-print key 105 and the non-add key 103. Again, the print bars rise when the crank is rotated, this time to positions representing the sine of 37 degrees 40.4 minutes. The selector mechanism properly locates the symbol on the first logarithmic film representing the mantissa of this value. As the motor switch 148 has automatically turned motor 144 off at the end of its cycle, the start switch 107 is again depressed. When the value of the mantissa has been registered on the keyboard, the operator moves crank 100 to cause this value to be printed, and to be set into the adding wheels.

After the reset button 108 has been depressed to reposition the drum, the number "307" is placed upon the keyboard, the non-print and the non-add keys are depressed, the crank 100 is operated, and the selector mechanism positions the corresponding mantissa pattern. After the motor start button 107 has been depressed and the mantissa placed upon the keyboard, the crank is again operated to cause this value to be printed just below the first and to be placed on the adding wheels. Then after the reset button 108 has been depressed preparing the drum to assume a new position, the total key 104 is likewise depressed to print the total of the mantissa values. This is accomplished when the crank 100 is operated, at which time the selector mechanism is also set in motion. Since the value now selected is the mantissa of the logarithm of the total which is not desired, the operator depresses the anti-logarithm key 109 to obtain the desired answer. This anti-logarithm will be placed on the keyboard after the motor start switch is closed and will be printed as the answer when the crank 100 is operated. The decimal point may readily be placed by estimation.

If a modern calculating machine were used having electric motor drive, a subtract key, and other familiar improvements, the operations would necessarily be made simpler and more flexible. It is also conceived that indicia might be printed beside the values to indicate those which are sines, angles, mantissa, and simple numbers just as totals and sub-totals are commonly indicated.

The illustrated embodiment may include an additional contact in the motor switch 148 by means of which the reset solenoids are energized just prior to the completion of a cycle but after the pattern has been translated, thereby preparing the drum for a new position. It is furthermore conceived that with the development of the art improved forms of the print bar sensor and the selector mechanism may well be devised.

In describing this device in the capacity of a numerical calculator, it is not intended that it should be limited to this useful form. Clearly, alphabetical letters and symbols of all kinds could be dealt with in a numberless variety of systems. The only necessity is that there be a predeterminable correspondence between the input and output symbols which may be systematically represented by a pattern of light.

This device provides a cascaded stored function selector which may receive as many as six variable parameters, a compact holder upon which over a million function values may be stored in symbol forms, each of these symbols corresponding to six parameters, means for optically amplifying the symbols and interpreting them, and for making a response in the same form as that of the stimulus received, that is, by setting the keys of the calculator.

While the embodiments of the present invention disclosed in the present description are deemed to be practical and efficient, the invention should not be considered as limited thereto as there might be changes made in the arrangement, disposition and form of the parts without departing from the principles of the present invention as comprehended within the scope of the accompanying claims.

I claim as my invention:

1. The combination comprising a recorder having a plurality of keys to be actuated, value-storing means including a film having discrete information imprinted in patterns thereon, optical projection means, selector means responsive to the actuation of the keys of said recorder for positioning selected portions of said film in position to have the pattern thereof projected by said optical projection means, and a photo-sensitive translator including means responsive to said projected pattern to actuate certain of said keys in correspondence therewith.

2. The combination comprising a recorder having a plurality of keys to be actuated, value-storing means including a plurality of films having information imprinted in discrete patterns in columns and rows thereon, optical projection means, selector means responsive to the actuation of the keys of said recorder for moving a selected one of said films in position to have a portion of its pattern projected by said optical projection means and to advance said film in the direction of said columns to position such a selected portion of its pattern for projection, and a photo-sensitive translator including means responsive to the projected pattern to actuate certain of said keys in correspondence therewith.

3. The combination comprising a recorder having a plurality of keys to be actuated, value-storing means including a plurality of films having discrete information imprinted in patterns thereon, a cage mounted for rotation and axial translation, a plurality of supply spools circumferentially spaced in said cage around the axis of rotation thereof, each supply spool carrying one of said films, a plurality of take-up spools mounted in said cage, each positioned to receive film from one of said supply spools, optical projection means mounted within said cage, selector means responsive to the actuation of the keys of said recorder for rotating said cage to position a selected one of said films opposite said optical projection means, said selector means also including means for advancing said films from their respective supply spools to their respective take-up spools and for axially shifting said cage, whereby a discrete portion of a selected one of said films is positioned to be optically projected by said optical projection means, and a photo-sensitive translator including means responsive to said projected pattern to actuate certain of said keys in correspondence therewith.

4. The combination comprising a recorder, means for materially storing recordable values including a member having optically distinctive patterns imprinted on a surface thereof seriatim in columns and rows, said patterns representing codified recordable values, optical projection means, selector means driven by said recorder to move said member relative to said projection means in the directions of said columns and rows, whereby one of said patterns corresponding to a value placed in said recorder will be positioned for projection, a photo-sensitive translator responsive to the projected pattern and operative to place in said recorder the value represented by said pattern for subsequent driving of said selector means.

5. In a calculating machine, the combination comprising means for materially storing recordable values including a member having optically distinctive patterns imprinted on a surface thereof seriatim in columns and rows, said patterns representing codified recordable values, optical projection means, selector means to move said member relative to said projection means in the directions of said columns and rows whereby one of said patterns will be positioned for projection, key-actuated recording means, sensing means responsive to a value recorded thereby to actuate said selector means to position a pattern which will have a functional relationship to the recorded value, a photo-sensitive translator responsive to the projected pattern having means operative to place the value represented by said pattern in said recording means for recordation and control of said sensing means.

6. In a calculating apparatus including a recorder, means for materially storing recordable values comprising a base, aligned spindles mounted thereon, spider hubs mounted on said spindles for rotation, film-holding spools journaled between said hubs, said spools grouped in sets of three including a supply spool, a drive spool and a take-up spool in each set, a single film associated with each set, means to revolve said drive spools about their individual axes including sun and planetary gear mechanism and a cascaded pinion drive, each said film having imprinted thereon codified patterns seriatim in columns and rows, a projector lamp suspended between said hubs and in alignment with said spindles, drive means for rotating said hubs to position one of said sets for projection, a second drive means operative upon said gear and pinion mechanism whereby said film is transferred between its associated spools, a third drive means acting upon said base whereby said film is translated in a direction axial with respect to said spools, all of said drives being controlled by said recorder, whereby the pattern associated with a single row and a single column of a selected film may be positioned for projection.

7. In a recorder having a means for materially storing recordable values associated therewith, mechanism for recording decimal numbers including a print bar for each decimal order, printing type representing the digits carried by said bars in vertical arrangement seriatim, a multi-contact electrical switch associated with each bar, solenoid drive means associated with each switch to select a stored value, said switches being rotated by said print bars in proportion to vertical movement thereof while bringing said type into printing position, said switches actuating said solenoid means each the number of times represented by the digit printed by the respective print bars, whereby said solenoid drive selects a stored value corresponding to the printable value placed in the said recorder.

8. In a register, the combination of a calculator, a function-storing means, function value selector means, an optical projector and a value translator, said storing means including a film and a film mount to position said film in discrete steps, said film having optically distinctive patterns imprinted thereon for projection by said projector onto said translator, said patterns each a codified function value arranged seriatim, said selector means being sensitive to a value in said calculator to adjust said film mount to a corresponding discrete position whereby a pattern is positioned for projection onto said translator, said translator comprising a photo-sensitive electrical device and scanning means to admit successive portions of said pattern to said device, means whereby said translator is electrically connected to said calculator so that the response of said photo-sensitive device to the projected pattern de-codes said pattern and places in said calculator a function value corresponding to the value sensed therein.

9. The combination comprising a recorder having a plurality of keys to be actuated and printing means controlled thereby, value storing means including a film having function and inverse function values imprinted thereon in spaced correspondent positions, optical projection means, selector means responsive to the actuation of said keys for positioning selected portions of said film for projection of one function by said optical projection means, a photo-sensitive translator including means responsive to the projection of said function value to actuate the keys corresponding to said value, means in said recorder for totalizing said values, and means for shifting said film to position the same for projection of the inverse function value corresponding to the totalized function value, thereby to translate the accumulated function values back into the form of information originally employed when said keys were actuated.

10. In a recorder, the combination of a mechanism for registering decimal numbers including a print bar for each digit in each decimal order, means controlled by said keys for projecting a light pattern codified to represent a function value of the number registered by said keys, a translator including a photo-sensitive switch and scanning means positioned to scan and respond to said projected light pattern, a digit selector switch synchronized with said scanning means, and solenoid means associated with each key and energized through said selector switch and said photo-sensitive switch, thereby to energize the keys corresponding to the digits of the projected pattern value in the order of scanning the pattern.

11. The combination comprising a decimal number calculator having a set of manually and electrically actuable digit keys, means for materially storing codified representations of function values, selector means controlled by said digit keys to identify the stored function value corresponding to the number placed on said keys, and a translator controlled by the material representation of the identified stored value to electrically actuate the digit keys corresponding thereto.

his
EMIK A. × AVAKIAN.
mark

Witness to mark:
GEORGE R. STEPHENSON.

REFERENCES CITED

The following references are of record in the file of this patent:

UNITED STATES PATENTS

| Number | Name | Date |
| --- | --- | --- |
| 2,288,520 | Geller | June 30, 1942 |

FOREIGN PATENTS

| Number | Country | Date |
| --- | --- | --- |
| 481,798 | Great Britain | Mar. 11, 1948 |
| 493,277 | Great Britain | Oct. 4, 1938 |
| 521,871 | Great Britain | June 3, 1940 |